United States Patent
Pedder et al.

(10) Patent No.: US 9,874,965 B2
(45) Date of Patent: Jan. 23, 2018

(54) TRANSPARENT STRAIN SENSORS IN AN ELECTRONIC DEVICE

(71) Applicant: Apple Inc., Cupertino, CA (US)

(72) Inventors: James E. Pedder, Cupertino, CA (US); Sunggu Kang, Cupertino, CA (US); David J. Meyer, Cupertino, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/851,579

(22) Filed: Sep. 11, 2015

(65) Prior Publication Data

US 2017/0075465 A1     Mar. 16, 2017

(51) Int. Cl.
*G06F 3/041* (2006.01)
*G06F 3/045* (2006.01)
*G01L 1/18* (2006.01)

(52) U.S. Cl.
CPC .............. *G06F 3/0414* (2013.01); *G01L 1/18* (2013.01); *G06F 3/045* (2013.01); *G06F 3/0416* (2013.01); *G06F 2203/04103* (2013.01); *G06F 2203/04105* (2013.01)

(58) Field of Classification Search
CPC ...... G06F 3/0414; G06F 3/0416; G06F 3/045; G06F 2203/04103
See application file for complete search history.

(56) References Cited

U.S. PATENT DOCUMENTS

| | | | |
|---|---|---|---|
| 3,876,912 A | 4/1975 | Sanders | |
| 4,345,477 A | 8/1982 | Johnson | |
| 4,423,640 A | 1/1984 | Jetter | |
| 4,516,112 A | 5/1985 | Chen | |
| 4,634,917 A | 1/1987 | Dvorsky et al. | |
| 4,695,963 A | 9/1987 | Sagisawa | |
| 4,951,510 A | 8/1990 | Holm-Kennedy et al. | |
| 5,481,905 A | 1/1996 | Pratt | |
| 5,673,041 A | 9/1997 | Chatigny et al. | |
| 5,708,460 A | 1/1998 | Young | |

(Continued)

FOREIGN PATENT DOCUMENTS

| | | |
|---|---|---|
| CN | 1527933 A | 9/2004 |
| CN | 1796955 | 7/2006 |

(Continued)

OTHER PUBLICATIONS

Bau, et al., "TeslaTouch: Electrovibration for Touch Surfaces," UIST'10, Oct. 3-6, 2010, New York, New York USA, 10 pages.
Feist, "Samsung snags patent for new pressure sensitive touchscreens," posted on AndroidAuthority.com at URL: http://www.androidauthority.com/samsung-patent-pressure-sensitive-touch-screens-354860, Mar. 7, 2014, 1 page.

(Continued)

*Primary Examiner* — Larry Sternbane
(74) *Attorney, Agent, or Firm* — Brownstein Hyatt Farber Schreck, LLP

(57) ABSTRACT

An electronic device includes one or more transparent strain sensors configured to detect strain based on an amount of force applied to the electronic device, a component in the electronic device, and/or an input surface of the electronic device. The one or more transparent strain sensors may be included in or positioned below an input surface that is configured to receive touch inputs from a user. The area below the input surface can be visible to a user when the user is viewing the input surface. The one or more transparent strain sensors are formed with a nanostructure, including a nanomesh or nanowires.

20 Claims, 7 Drawing Sheets

(56) References Cited

U.S. PATENT DOCUMENTS

| | | |
|---|---|---|
| 5,915,285 A | 6/1999 | Sommer |
| 6,288,829 B1 | 9/2001 | Kimura |
| 7,154,481 B2 | 12/2006 | Cross et al. |
| 7,176,897 B2 | 2/2007 | Roberts |
| 7,190,350 B2 | 3/2007 | Roberts |
| 7,196,694 B2 | 3/2007 | Roberts |
| 7,211,885 B2 | 5/2007 | Nordal et al. |
| 7,392,716 B2 | 7/2008 | Wilner |
| 7,441,467 B2 | 10/2008 | Bloom |
| 7,511,702 B2 | 3/2009 | Hotelling |
| 7,724,248 B2 | 5/2010 | Saito |
| 7,755,616 B2 | 7/2010 | Jung et al. |
| 7,800,592 B2 | 9/2010 | Kerr et al. |
| 8,020,456 B2 | 9/2011 | Liu et al. |
| 8,050,876 B2 | 11/2011 | Feen et al. |
| 8,077,154 B2 | 12/2011 | Emig et al. |
| 8,266,971 B1 | 9/2012 | Jones |
| 8,305,358 B2 | 11/2012 | Klinghult et al. |
| 8,421,483 B2 | 4/2013 | Klinghult et al. |
| 8,456,430 B2 | 6/2013 | Oliver et al. |
| 8,519,974 B2 | 8/2013 | Berggren |
| 8,605,053 B2 | 12/2013 | Murphy et al. |
| 8,648,816 B2 | 2/2014 | Homma et al. |
| 8,669,952 B2 | 3/2014 | Hashimura et al. |
| 8,669,962 B2 | 3/2014 | Kuan |
| 8,711,128 B2 | 4/2014 | Small et al. |
| 8,780,060 B2 | 7/2014 | Maschmeyer et al. |
| 8,780,074 B2 | 7/2014 | Castillo et al. |
| 8,780,543 B2 | 7/2014 | Molne et al. |
| 8,870,087 B2 | 10/2014 | Coogan et al. |
| 8,878,803 B2 | 11/2014 | Kimura et al. |
| 9,024,910 B2 | 5/2015 | Stephanou et al. |
| 9,030,427 B2 | 5/2015 | Yasumatsu |
| 9,063,599 B2 | 6/2015 | Yanagi et al. |
| 9,099,971 B2 | 8/2015 | Lynn et al. |
| 9,110,532 B2 | 8/2015 | Ando et al. |
| 9,116,569 B2 | 8/2015 | Stacy et al. |
| 9,182,849 B2 | 11/2015 | Huang et al. |
| 9,182,859 B2 | 11/2015 | Coulson et al. |
| 9,223,162 B2 | 12/2015 | DeForest et al. |
| 9,262,002 B2 | 2/2016 | Momeyer et al. |
| 9,304,348 B2 | 4/2016 | Jang |
| 9,383,848 B2 | 7/2016 | Daghigh |
| 9,417,696 B2 | 8/2016 | DeLuca |
| 9,417,725 B1 | 8/2016 | Watazu et al. |
| 9,454,268 B2 | 9/2016 | Badaye et al. |
| 9,507,456 B2 | 11/2016 | Watazu et al. |
| 9,542,028 B2 | 1/2017 | Filiz et al. |
| 9,612,170 B2 | 4/2017 | Vosgueritchian et al. |
| 9,658,722 B2 | 5/2017 | Schwartz |
| 9,665,200 B2 | 5/2017 | Filiz et al. |
| 9,690,414 B2 | 6/2017 | Kano et al. |
| 9,729,730 B2 | 8/2017 | Levesque et al. |
| 2001/0020985 A1* | 9/2001 | Hinata ............... G06F 3/0412 349/12 |
| 2002/0149571 A1 | 10/2002 | Roberts |
| 2008/0165159 A1 | 7/2008 | Soss et al. |
| 2008/0218488 A1 | 9/2008 | Yang et al. |
| 2009/0002199 A1 | 1/2009 | Lainonen et al. |
| 2009/0189866 A1 | 7/2009 | Haffenden et al. |
| 2009/0316380 A1 | 12/2009 | Armstrong |
| 2010/0053116 A1 | 3/2010 | Daverman et al. |
| 2010/0103115 A1 | 4/2010 | Hainzl |
| 2010/0117809 A1 | 5/2010 | Dai et al. |
| 2011/0026202 A1* | 2/2011 | Kai ................... G06F 3/0414 361/679.01 |
| 2011/0045285 A1 | 2/2011 | Saiki et al. |
| 2011/0248839 A1 | 10/2011 | Kwok et al. |
| 2011/0261021 A1 | 10/2011 | Modarres et al. |
| 2011/0285660 A1 | 11/2011 | Prabhu et al. |
| 2012/0038577 A1 | 2/2012 | Brown et al. |
| 2012/0105367 A1 | 5/2012 | Son et al. |
| 2012/0127136 A1 | 5/2012 | Schneider et al. |
| 2012/0139864 A1 | 6/2012 | Sleeman et al. |
| 2012/0154299 A1 | 6/2012 | Hsu et al. |
| 2012/0188198 A1 | 7/2012 | Jeong et al. |
| 2012/0256838 A1* | 10/2012 | Lee ................... H03K 17/9643 345/168 |
| 2012/0292162 A1* | 11/2012 | Jeong ................. G06F 3/045 200/181 |
| 2012/0293491 A1 | 11/2012 | Wang et al. |
| 2012/0297885 A1* | 11/2012 | Hou ................... G06F 3/0414 73/718 |
| 2013/0009905 A1* | 1/2013 | Castillo ............. G06F 3/044 345/174 |
| 2013/0074988 A1 | 3/2013 | Chou |
| 2013/0082970 A1* | 4/2013 | Frey ................... G06F 3/0414 345/173 |
| 2013/0141365 A1 | 6/2013 | Lynn et al. |
| 2013/0147739 A1 | 6/2013 | Aberg et al. |
| 2013/0154933 A1 | 6/2013 | Sheik-Nainar |
| 2013/0215056 A1 | 8/2013 | Johansson et al. |
| 2013/0328803 A1 | 12/2013 | Fukushima et al. |
| 2013/0333922 A1 | 12/2013 | Kai et al. |
| 2014/0028573 A1* | 1/2014 | Olien ................. G06F 3/016 345/173 |
| 2014/0055407 A1* | 2/2014 | Lee ................... G06F 3/0416 345/174 |
| 2014/0118635 A1* | 5/2014 | Yang ................. G06F 1/1692 349/12 |
| 2014/0174190 A1 | 6/2014 | Kulkarni et al. |
| 2014/0191973 A1* | 7/2014 | Zellers .............. G06F 3/0414 345/168 |
| 2015/0002452 A1 | 1/2015 | Klinghult |
| 2015/0101849 A1 | 4/2015 | Bockmeyer et al. |
| 2015/0116260 A1 | 4/2015 | Hoen et al. |
| 2015/0268725 A1 | 9/2015 | Levesque et al. |
| 2015/0301084 A1 | 10/2015 | Shimamura |
| 2015/0331517 A1 | 11/2015 | Filiz et al. |
| 2016/0033389 A1* | 2/2016 | Serpe ................ G01N 5/025 73/29.01 |
| 2016/0034073 A1 | 2/2016 | Andoh |
| 2016/0035290 A1 | 2/2016 | Kim et al. |
| 2016/0041672 A1 | 2/2016 | Hoen et al. |
| 2016/0048266 A1 | 2/2016 | Smith et al. |
| 2016/0062517 A1 | 3/2016 | Meyer et al. |
| 2016/0117035 A1 | 4/2016 | Watazu et al. |
| 2016/0132151 A1 | 5/2016 | Watazu et al. |
| 2016/0147353 A1 | 5/2016 | Filiz et al. |
| 2016/0306481 A1 | 10/2016 | Filiz et al. |
| 2016/0357297 A1 | 12/2016 | Picciotto et al. |
| 2017/0031495 A1 | 2/2017 | Smith |
| 2017/0090638 A1 | 3/2017 | Vosgueritchian et al. |
| 2017/0090655 A1 | 3/2017 | Zhang et al. |
| 2017/0191884 A1 | 7/2017 | Vosgueritchian et al. |
| 2017/0261387 A1 | 9/2017 | Vosgueritchian et al. |
| 2017/0269757 A1 | 9/2017 | Filiz et al. |
| 2017/0285864 A1 | 10/2017 | Pedder et al. |

FOREIGN PATENT DOCUMENTS

| | | |
|---|---|---|
| CN | 1860432 | 11/2006 |
| CN | 101017419 | 8/2007 |
| CN | 101071354 | 11/2007 |
| CN | 101201227 A | 6/2008 |
| CN | 101950224 | 1/2011 |
| CN | 102012772 | 4/2011 |
| CN | 102165400 | 8/2011 |
| CN | 102175362 A | 9/2011 |
| CN | 102460351 | 5/2012 |
| CN | 102591519 | 7/2012 |
| CN | 102822779 | 12/2012 |
| CN | 103026327 | 4/2013 |
| CN | 103069365 | 4/2013 |
| CN | 103197821 | 7/2013 |
| CN | 103336562 | 10/2013 |
| CN | 103582807 | 2/2014 |
| CN | 204461655 U | 7/2015 |
| CN | 204576454 U | 8/2015 |
| CN | 105444662 | 3/2016 |
| EP | 0332365 | 9/1989 |
| EP | 0467562 | 1/1992 |
| EP | 1840714 | 10/2007 |

(56) References Cited

FOREIGN PATENT DOCUMENTS

| EP | 2120136 | 11/2009 |
|---|---|---|
| EP | 2381340 | 10/2011 |
| EP | 2629075 | 8/2013 |
| FR | 2907563 | 4/2008 |
| JP | 201039458 A | 2/2010 |
| JP | 2010197066 | 9/2010 |
| WO | WO 96/38833 | 12/1996 |
| WO | WO 02/035461 | 5/2002 |
| WO | WO 2007/074800 | 7/2007 |
| WO | WO 2011/156447 | 12/2011 |
| WO | WO 2012/168892 | 12/2012 |
| WO | WO 2013/177322 | 11/2013 |
| WO | WO 2015/106183 | 7/2015 |
| WO | WO 2015/158952 | 10/2015 |
| WO | WO 16/029354 | 3/2016 |

OTHER PUBLICATIONS

Rausch, "Printed piezoresistive strain sensors for monitoring of light-weight structures," SENSOR+TEST Conferences 2011—SENSOR Proceedings, pp. 216-220.

Schweizer, "Electrical characterization and investigation of the piezoresistive effect of PEDOT:PSS thin films," A Thesis Presented to the Academic Faculty in Partial Fulfillment of the Requirements for the Degree Master of Science of Electrical and Computer Engineering, Georgia Institute of Technology, Apr. 2005, 89 pages.

Takamatsu, et al., "Transparent conductive-polymer strain sensors for touch input sheets of flexible displays," *Journal of Micromechanics and Microengineering*, vol. 20, 2010, 6 pages.

Tsai, et al., "Fabrication of Graphene-based Micro Strain Gauge," NPL Management Ltd.—Internal, Oct. 15-16, 2012, 1 page.

* cited by examiner

TRANSPARENT STRAIN SENSORS IN AN ELECTRONIC DEVICE

FIELD

Embodiments described herein generally relate to electronic devices. More particularly, the present embodiments relate to one or more transparent strain sensors in an electronic device.

BACKGROUND

Touch displays have become increasingly popular in electronic devices. Cell phones, tablet computing devices, computer monitors, and so forth, are increasingly equipped with displays that are configured to sense touch as a user input. The touch may be sensed in accordance with one of several different touch sensing techniques including, but not limited to, capacitive touch sensing.

Touch sensitive devices generally provide position identification of where the user touches the device. A touch may include movement, gestures, and other effects related to position detection. For example, touch sensitive devices can provide information to a computing system regarding user interaction with a graphical user interface (GUI) of a display, such as pointing to elements, reorienting or repositioning elements, editing or typing, and other GUI features. While the touch sensitive devices provide an input mechanism that provides an appearance that the user is interacting directly with element displayed in the GUI, the input is generally limited to the x-, y-positioning of the touch. In some cases, the input sensitivity has been increased to allow for multi-touch inputs, but this is still limited to positional constraints of the surface upon which the touch is sensed. Some applications and programs may benefit from additional input modes beyond that provided strictly by the touch sensing.

SUMMARY

One or more transparent strain sensors can be included in an electronic device and used to detect force and/or a change in force. In one embodiment, the strain sensor(s) are used to detect a force that is applied to the electronic device, to a component in the electronic device, such as an input button, and/or to an input region or surface of the electronic device. In one non-limiting example, a force sensing device that includes one or more transparent strain sensors may be incorporated into a display stack of an electronic device. The one or more transparent strain sensors can be positioned in an area of the display stack that is visible to a user when the user is viewing the display. The transparent strain sensors can be formed with one or more nanostructures, including a nanomesh structure and a nanowire structure. In one embodiment, the nanostructure is formed with nickel or a nickel alloy.

In one aspect, an electronic device can include an input surface configured to receive touch inputs and a strain sensitive structure positioned below the input surface. The strain sensitive structure may include a first transparent strain sensor formed with a nanostructure and positioned on a first surface of a transparent insulating substrate. A processing device can be operably connected to the first transparent strain sensor and configured to determine an amount of force applied to the input surface based on signals received from the first transparent strain sensor. In some embodiments, a second transparent strain sensor formed with a nanostructure is positioned on a second surface of the transparent insulating substrate. The second transparent strain sensor can align vertically with the first transparent strain sensor to produce a strain sensing element. The processing device can be configured to determine an amount of force applied to the input surface based on signals received from the strain sensing element.

In another aspect, an electronic device may include one or more strain sensors in a display stack of a display. The display stack can include a cover glass and a strain sensitive structure positioned below the cover glass. The strain sensitive structure may include a first set of transparent strain sensors positioned on a first surface of a transparent substrate and a second set of transparent strain sensitive elements positioned on a second surface of the transparent substrate. The first and second sets of transparent strain sensors are positioned in an area that is visible when viewing the display. The first and second sets of strain sensors can each include one or more strain sensors, and each transparent strain sensor in the first and second sets of transparent strain sensors is formed with a nanostructure.

In yet another aspect, a method of providing a transparent strain sensitive structure in an electronic device can include providing a set of transparent strain sensors each formed with a nanostructure and providing the set of transparent strain sensors on at least one surface of a transparent substrate to produce the strain sensitive structure. In some embodiments, the strain sensitive structure is produced by forming a first set of transparent strain sensors on a first surface of the transparent substrate and forming a second set of transparent strain sensors on a second surface of the transparent substrate. In one embodiment, each transparent strain sensor can be configured as a strain gauge formed with a nanostructure, such as a nanomesh or nanowires. The strain sensitive structure can then be positioned in the electronic device.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
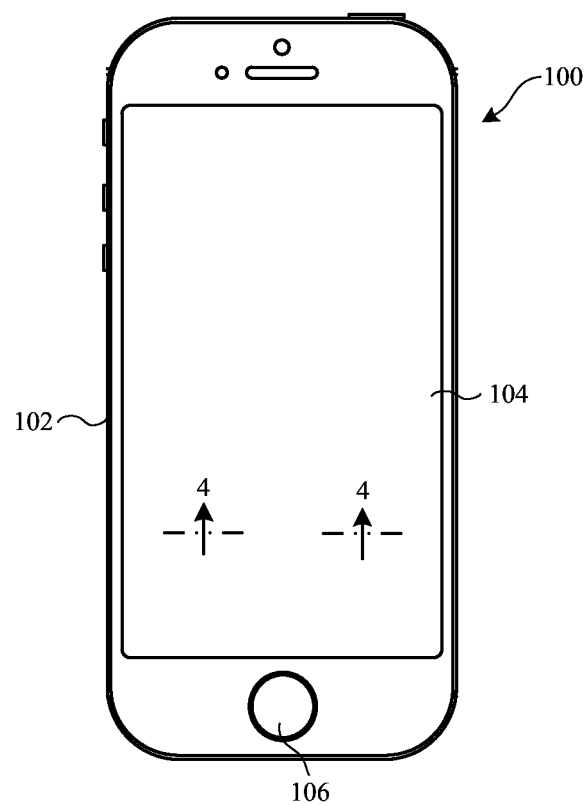
FIG. 1 shows one example of an electronic device that can include one or more strain sensors.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments described herein provide an electronic device that includes one or more transparent strain sensors configured to detect strain based on an amount of force applied to the electronic device, a component in the electronic device, and/or an input surface of the electronic device. The one or more transparent strain sensors may be included in or positioned below a user-viewable input surface that is configured to receive touch inputs from a user. The user can perform the touch inputs with a body part (e.g., a finger) or with a device, such as a stylus. In some embodiments, the one or more transparent strain sensors are located in an area of the electronic device that is visible to a user when the user is viewing the input surface. In one embodiment, the one or more transparent stain sensors comprise strain gauges formed with an optically transparent material. As used herein, "optically transparent" is defined broadly to include a material that is transparent, translucent, or is not visibly discernible by the human eye.

For example, the one or more transparent strain sensors can be incorporated into a display stack of an electronic device. At least a portion of the top surface of the display screen may be configured to be an input surface for the electronic device. The strain sensor(s) are formed with an optically transparent material or materials. In one embodiment, the one or more strain sensors are formed with one or more nanostructures, including a nanomesh structure or a nanowire structure.

A strain gauge formed with a nanostructure can be optically transparent to a user, which means the visibility of the strain gauge is not an issue when positioning the strain gauge in a location within an electronic device that is visible or viewable by a user. In one embodiment, the nanostructure is formed with a metal, such as nickel. A metal such as nickel has several properties that are advantageous when used in strain gauges. One property is the gauge factor of nickel. The gauge factor of a strain sensor represents the sensitivity of the material to strain. In other words, the gauge factor indicates how much the electrical resistance of the strain sensor changes with strain. The higher the gauge factor, the larger the change in resistance. Higher gauge factors allow a greater range of strain to be detected and measured. The magnitude of the gauge factor for nickel is relatively high and is negative. Thus, strain sensors formed with nickel (e.g., nickel nanowires or nanomesh) can be more sensitive to strain and permit a greater range of strain to be detected.

Another desirable property is the temperature coefficient of resistance (TCR), which defines the change in resistance as a function of ambient temperature. A positive TCR refers to a conductive material that experiences an increase in electrical resistance with an increase in temperature. Conversely, a negative TCR refers to a conductive material that experiences a decrease in electrical resistance with a decrease in temperature. Nickel has a positive TCR, which means the electrical resistance of a strain gauge formed with nickel increases as the temperature increases.

These and other embodiments are discussed below with reference to FIGS. 1-8. However, those skilled in the art will readily appreciate that the detailed description given herein with respect to these Figures is for explanatory purposes only and should not be construed as limiting.

Directional terminology, such as "top", "bottom", "front", "back", "leading", "trailing", etc., is used with reference to the orientation of the Figure(s) being described. Because components of embodiments described herein can be positioned in a number of different orientations, the directional terminology is used for purposes of illustration only and is in no way limiting. When used in conjunction with layers of a display or device, the directional terminology is intended to be construed broadly, and therefore should not be interpreted to preclude the presence of one or more intervening layers or other intervening features or elements. Thus, a given layer that is described as being formed, positioned, disposed on or over another layer, or that is described as being formed, positioned, disposed below or under another layer may be separated from the latter layer by one or more additional layers or elements.

FIG. 1 shows one example of an electronic device that can include one or more strain sensors. In the illustrated embodiment, the electronic device 100 is implemented as a smart telephone. Other embodiments can implement the electronic device differently. For example, an electronic device can be a laptop computer, a tablet computing device, a wearable computing device, a smart watch, a digital music player, a display input device, a remote control device, and other types of electronic devices that include one or more force sensors.

The electronic device 100 includes an enclosure 102 surrounding a display 104 and one or more input/output (I/O) devices 106 (shown as button). The enclosure 102 can form an outer surface or partial outer surface for the internal components of the electronic device 100, and may at least partially surround the display 104. The enclosure 102 can be formed of one or more components operably connected together, such as a front piece and a back piece. Alternatively, the enclosure 102 can be formed of a single piece operably connected to the display 104.

The display 104 can be implemented with any suitable display, including, but not limited to, a multi-touch sensing touchscreen device that uses liquid crystal display (LCD) technology, light emitting diode (LED) technology, organic light-emitting display (OLED) technology, or organic electro luminescence (OEL) technology.

In some embodiments, the I/O device 106 can take the form of a home button, which may be a mechanical button, a soft button (e.g., a button that does not physically move but still accepts inputs), an icon or image on a display, and so on. Further, in some embodiments, the button can be integrated as part of a cover glass of the electronic device. Although not shown in FIG. 1, the electronic device 100 can include other types of I/O devices, such as a microphone, a speaker, a camera, and one or more ports such as a network communication port and/or a power cord port.

Strain sensors can be included in one or more locations of the electronic device 100. For example, in one embodiment one or more strains sensors may be included in the I/O device 106. The strain sensor(s) can be used to measure an amount of force and/or a change in force that is applied to the I/O device 106. In another embodiment, one or more strain sensors can be positioned under at least a portion of the enclosure to detect a force and/or a change in force that is applied to the enclosure. Additionally or alternatively, one or more strains sensors may be included in a display stack for the display 104. The strain sensor(s) can be used to measure an amount of force and/or a change in force that is applied to the display or to a portion of the display. As described earlier, a strain sensor includes a strain sensitive element and at least one strain signal line physically or directly connected to the strain sensitive element.

Figure 2:
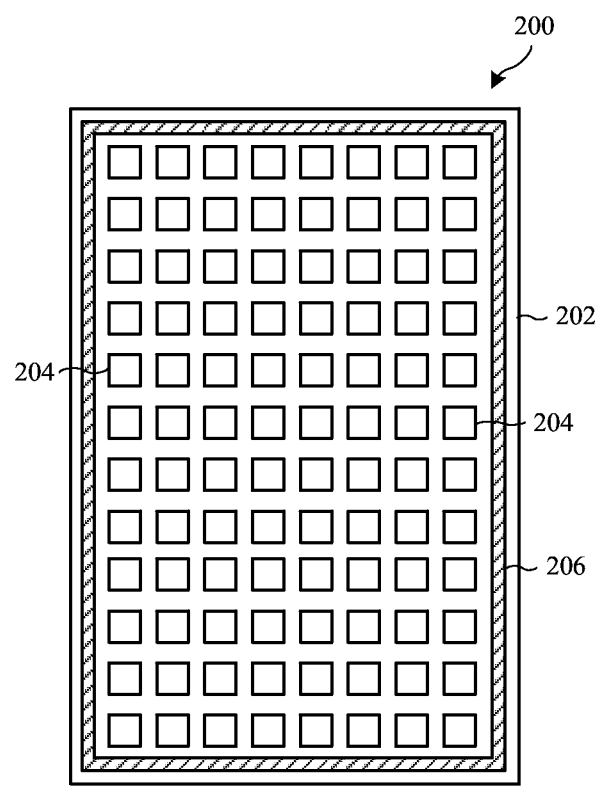
FIG. 2 shows a plan view of an example strain sensitive structure that is suitable for use in a display stack of an electronic device.
Figure 3A:
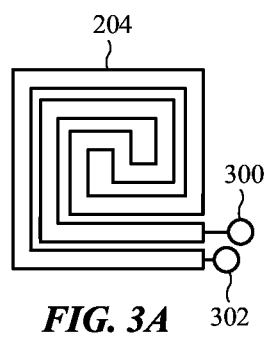
FIGS. 3A-3B show plan views of example strain sensors that may be used in the example strain sensitive structure depicted in FIG. 2.
Figure 3B:
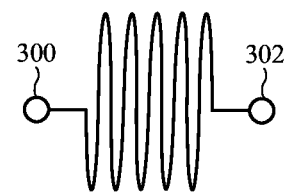

In one non-limiting example, the entire top surface of a display may be an input surface that is configured to receive one or more touch and force inputs from a user. FIG. 2 depicts a plan view of an example strain sensitive structure that is suitable for use in a display stack. The strain sensitive structure 200 can include a grid of independent optically transparent strain sensors 204 that are formed in or on a substrate 202. The strain sensors 204 may be formed in or on at least a portion of one or both surfaces of the substrate 202. The substrate 202 can be formed of any suitable material or materials. In one embodiment, the substrate 202 is formed with an optically transparent material, such as polyethylene terephthalate (PET).

As discussed earlier, the strain sensors 204 are configured to detect strain based on an amount of force applied to the input surface of the display. The strain sensors 204 may be formed with a transparent conductive material or materials such as, for example, nickel nanowire, nickel nanomesh, other metallic nanostructures, and the like. In certain embodiments, the strain sensors 204 may be selected at least in part on temperature characteristics. For example, the material selected for transparent strain sensors 204 may have a negative temperature coefficient of resistance such that, as temperature increases, the electrical resistance decreases.

In this example, the transparent strain sensors 204 are formed as an array of rectilinear sensing elements, although other shapes and array patterns can also be used. In many examples, each individual strain sensor 204 may have a selected shape and/or pattern. For example, in certain embodiments, a strain sensor 204 may be deposited in a serpentine pattern, such as the pattern shown in FIG. 3A or FIG. 3B. A strain sensor 204 can have a different pattern or configuration in other embodiments.

The strain sensor 204 may include at least two electrodes 300, 302 that are configured to be physically or directly connected to one or more strain signal lines (not shown). The strain signal line(s) can be connected to a conductive contact 206, which operably connects the strain sensor 204 to sense circuitry (not shown). The conductive contact 206 may be a continuous contact or can be formed in segments that surround or partially surround the array of strain sensors 204. In other embodiments, a strain sensor 204 may be electrically connected to sense circuitry without the use of electrodes. For example, a strain sensor 204 may be connected to the sense circuitry using conductive traces that are formed as part of a film layer.

Figure 4:
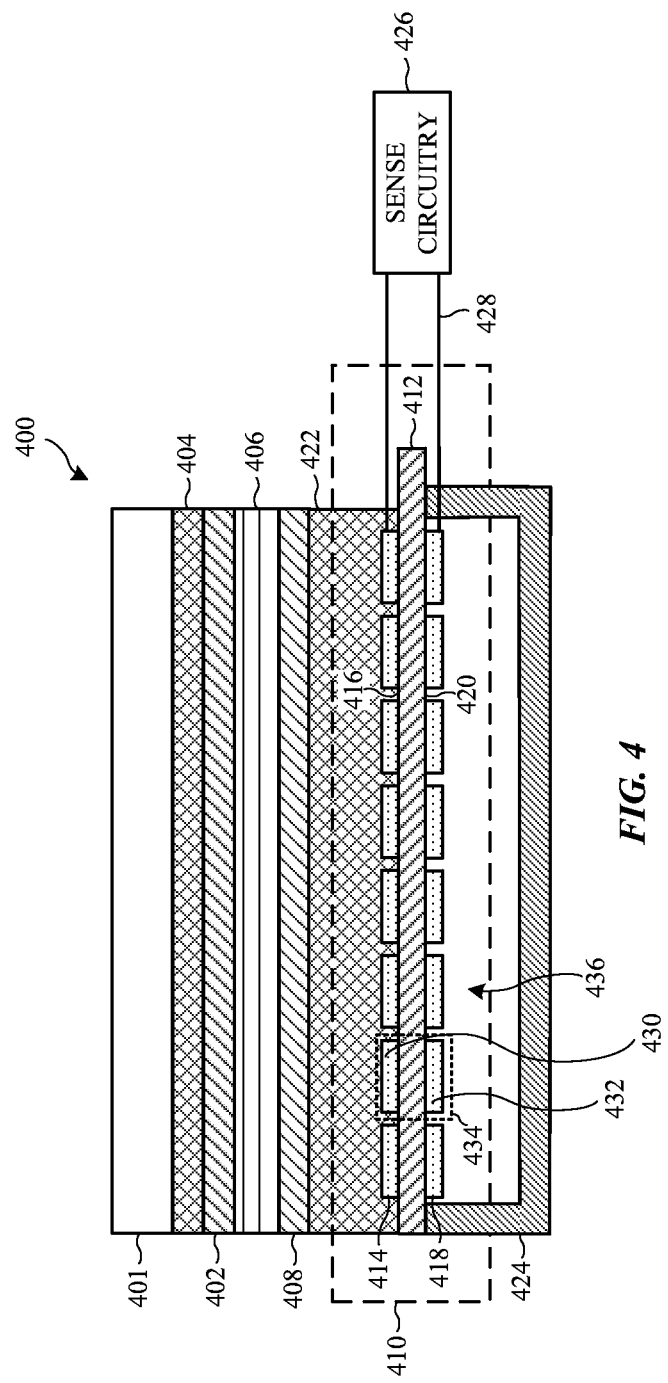
FIG. 4 shows a cross-sectional view of the display taken along line 4-4 in FIG. 1.

FIG. 4 depicts a cross-sectional view of the display taken along line 4-4 in FIG. 1. The cross-sectional view illustrates a display stack 400 for the display 104. A cover glass 401 is positioned over a front polarizer 402. The cover glass 401 can be a flexible touchable surface that is made of any suitable material, such as, for example, a glass, a plastic, sapphire, or combinations thereof. The cover glass 401 can act as an input surface for a touch sensing device and a force sensing device by receiving touch and force inputs from a user. The user can touch the cover glass 401 with one or more fingers or with another element such as a stylus.

An adhesive layer 404 can be disposed between the cover glass 401 and the front polarizer 402. Any suitable adhesive can be used in the adhesive layer, such as, for example, an optically clear adhesive. A display layer 406 can be positioned below the front polarizer 402. As described previously, the display layer 406 may take a variety of forms, including a liquid crystal display (LCD), a light-emitting diode (LED) display, and an organic light-emitting diode (OLED) display. In some embodiments, the display layer 406 can be formed from glass or have a glass substrate. Embodiments described herein include a multi-touch touchscreen LCD display layer.

Additionally, the display layer 406 can include one or more layers. For example, a display layer 406 can include a VCOM buffer layer, a LCD display layer, and a conductive layer disposed over and/or under the display layer. In one embodiment, the conductive layer may comprise an indium tin oxide (ITO) layer.

A rear polarizer 408 may be positioned below the display layer 406, and a strain sensitive structure 410 below the rear polarizer 408. The strain sensitive structure 410 includes a substrate 412 having a first set of independent strain sensors 414 on a first surface 416 of the substrate 412 and a second set of independent strain sensors 418 on a second surface 420 of the substrate 412. In the illustrated embodiment, the first and second surfaces 416, 420 are opposing top and bottom surfaces of the substrate 412, respectively. An adhesive layer 422 may attach the substrate 412 to the rear polarizer 408.

As described earlier, the strain sensors may be formed as an array of rectilinear strain sensing elements. Each strain sensor in the first set of independent strain sensors 414 is aligned vertically with a respective one of the strain sensors in the second set of independent strain sensors 418. In many embodiments, each individual strain sensor may take a selected shape. For example, in certain embodiments, the strain sensors may be deposited in a serpentine pattern, similar to the serpentine patterns shown in FIGS. 3A and 3B.

A back light unit 424 can be disposed below the strain sensitive structure 410. The back light unit 424 may be configured to support one or more portions of the substrate 412 that do not include strain sensors. For example, as shown in FIG. 4, the back light unit 424 can support the ends of the substrate 412. Other embodiments may configure a back light unit differently.

The strain sensors are typically connected to sense and processing circuitry 426 through conductive connectors 428 (e.g., signal routing lines). In one embodiment, the sense and processing circuitry 426 is configured to receive signals from the strain sensors and detect changes in an electrical property of each of the strain sensors based on the signals. In this example, the sense and processing circuitry 426 may be configured to detect changes in the resistance of the strain sensors, which can be correlated to an amount of force that is applied to the cover glass 401. In some embodiments, the sense and processing circuitry 426 may also be configured to provide information about the location of a touch based on the relative difference in the change of resistance of the strain sensors 414, 418.

Figure 5:
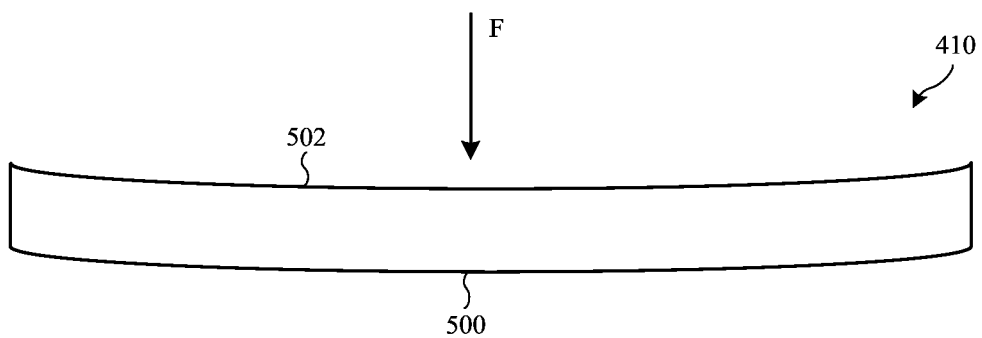
FIG. 5 shows a simplified side view of the strain sensitive structure responding to force.

For example, as discussed earlier, the strain sensors can be configured as strain gauges that are formed with a piezoresistive nanostructure. When a force is applied to an input surface (e.g., the cover glass 401), the planar strain sensitive structure 410 is strained and the resistance of the piezoresistive nanostructure changes in proportion to the strain. As shown in FIG. 5, the force F can cause the strain sensitive structure 410 to bend slightly. The bottom 500 of the strain sensitive structure 410 elongates while the top 502 compresses. The strain gauges measure the elongation or compression of the surface, and these measurements can be correlated to the amount of force applied to the input surface.

Two vertically aligned strain sensors (e.g., 430 and 432) form a strain sensing element 434. The sense and processing circuitry 426 may be adapted to receive signals from each strain sensing element and determine a difference in an electrical property of each strain sensing element 434. For example, as described above, a force may be received at the cover glass 401, which in turn causes the strain sensitive structure 410 to bend. The sense and processing circuitry 426 is configured to detect changes in an electrical property (e.g., resistance) of the one or more strain sensing elements 434 based on signals received from the strain sensing elements 434, and these changes can be correlated to the amount of force applied to the cover glass 401.

In the illustrated embodiment, a gap 436 exists between the strain sensitive structure 410 and the back light unit 424. Strain measurements intrinsically measure the force at a point on the top surface 416 of the substrate 412 plus the force from the bottom at that point on the bottom surface 420 of the substrate 412. When the gap 436 is present, there are no forces on the bottom surface 420. Thus, the forces on the top surface 416 can be measured independently of the forces on the bottom surface 420. In alternate embodiments, the strain sensitive structure 410 may be positioned above the display layer when the display stack 400 does not include the gap 436.

Other embodiments can configure a strain sensitive structure differently. For example, a strain sensitive structure can include only one set of transparent strain sensors on a surface of the substrate. A processing device may be configured to determine an amount of force, or a change in force, applied to an input surface based on signals received from the set of transparent strain sensors. Additionally or alternatively, one strain sensor in a strain sensing element may be made of a material or materials that differ from the material(s) used to form the other strain sensor in the strain sensing element.

Figure 6:
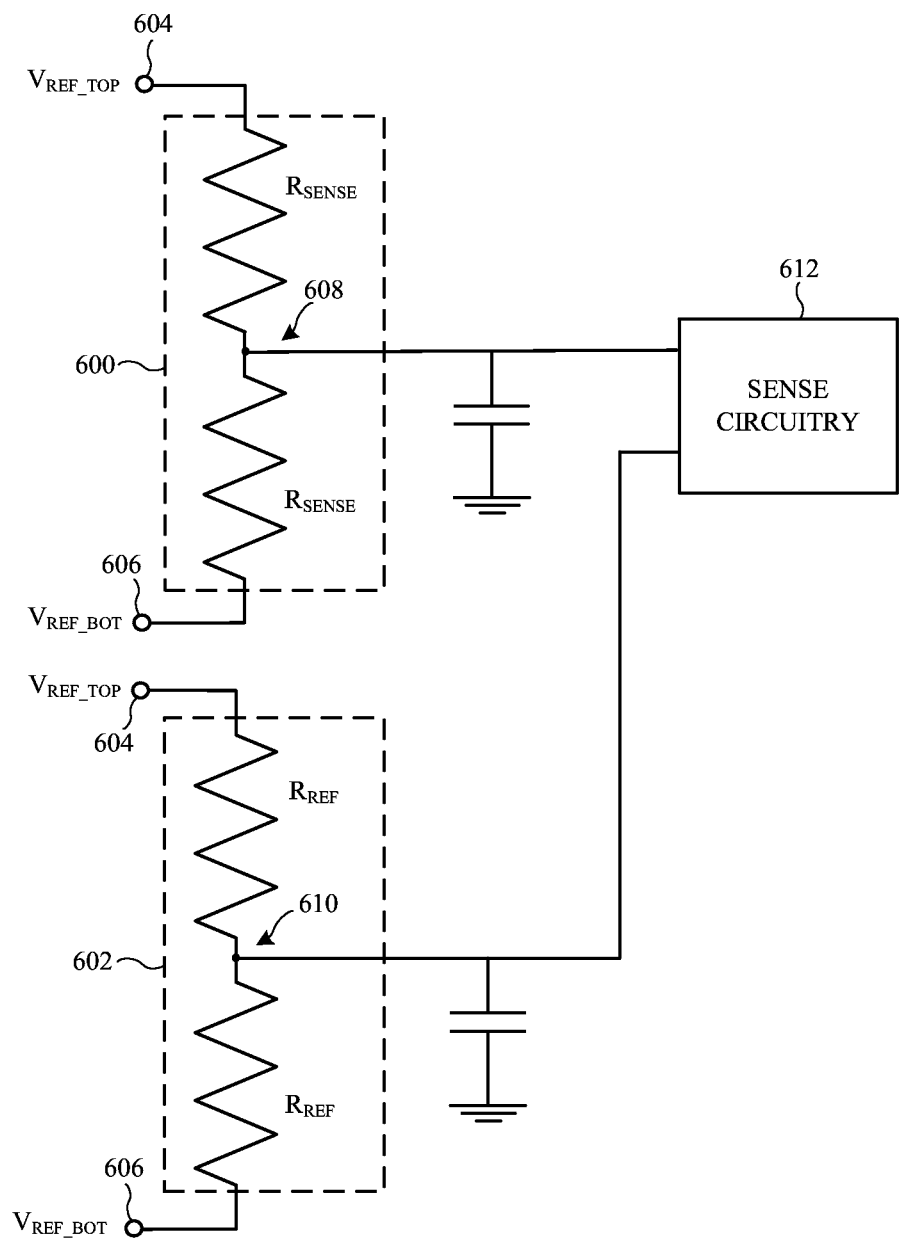
FIG. 6 shows a simplified schematic diagram of sense circuitry operably connected to a strain sensing device.

FIG. 6 shows a simplified schematic diagram of sense circuitry operably connected to a strain sensing element. The two-vertically aligned strain sensors in the strain sensing element 600 (e.g., 434 in FIG. 4) can be modeled as two resistors $R_{SENSE}$ configured as a voltage divider. A reference voltage divider 602 includes two reference resistors $R_{REF}$. As one example, the strain sensing element 600 and the reference voltage divider 602 may be modeled as a Wheatstone full bridge circuit, with the strain sensing element 600 forming one half bridge of the Wheatstone bridge circuit and the reference voltage divider 602 forming the other half bridge of the Wheatstone full bridge circuit. Other embodiments can model the strain sensors and the reference resistors differently. For example, a strain sensitive structure may include only one set of strain sensors and a particular strain sensor and a reference resistor can be modeled as a Wheatstone half bridge circuit.

A first reference voltage ($V_{REF\_TOP}$) is received at node 604 and a second reference voltage ($V_{REF\_Bar}$) is received at node 606. Sense and processing circuitry 612 is operably connected to the strain sensing element 600 and the reference voltage divider 602 at nodes 608, 610, respectively. The sense and processing circuitry 612 receives a force signal at node 608 and a reference signal at node 610. The sense and processing circuitry 612 is configured to detect changes in an electrical property (e.g., electrical resistance) of the strain sensing element 600 based on the differences in the force and reference signals of the two voltage dividers. The changes can be correlated to the amount of force applied to a respective input surface in an electronic device (e.g., the cover glass 401 in FIG. 4).

In one embodiment, the sense and processing circuitry 612 can include a multiplexer (not shown) operably connected between the strain sensing element 600 and an amplifier (not shown), such as, for example, a differential programmable gain amplifier. The output of the amplifier may be operably connected to an analog-to-digital converter (ADC) (not shown). A processing device (not shown) can be operably connected to the output of the ADC. Other embodiments can include additional or different components in the sense and processing circuitry.

Figure 7:
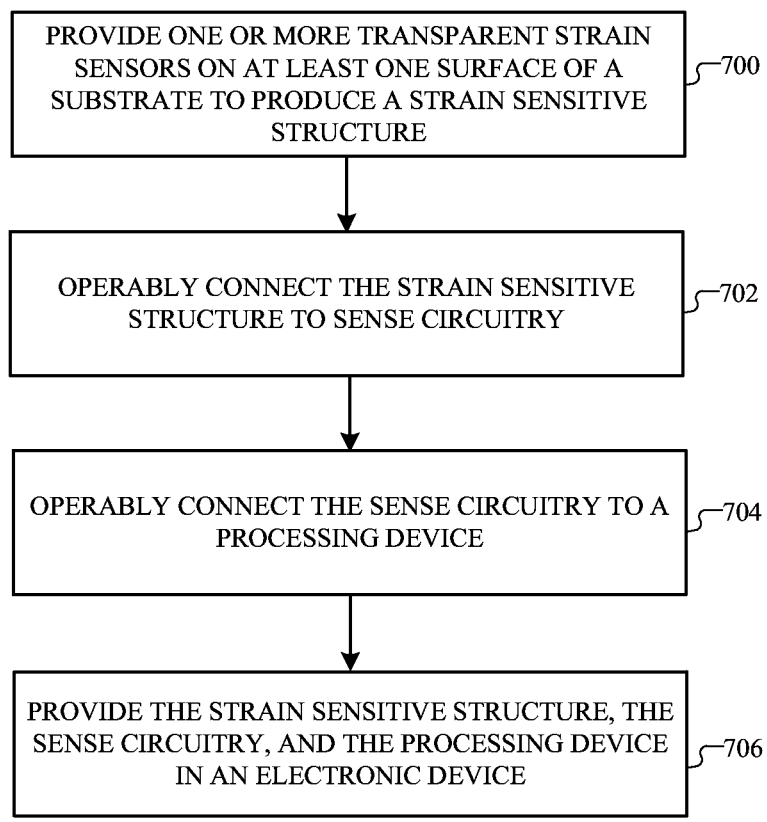
FIG. 7 depicts a flowchart of an example method of providing a strain sensitive structure in an electronic device.

FIG. 7 depicts a flowchart of an example method of providing a strain sensitive structure in an electronic device. Initially, as shown in block 700, one or more strain sensors are provided on at least one surface of a substrate to produce a strain sensitive structure. For example, in the display stack shown in FIG. 4, the first and second sets of independent strain sensors 414, 418 are formed on two respective surfaces 416, 420 of the substrate 412. In one embodiment, the strain sensors are strain gauges that are included in a film layer formed over a surface of the substrate. As described earlier, the strain gauges can be formed with a nanostructure, such as a nanomesh structure or a nanowire structure that includes multiple nanowires. In one embodiment, the nanostructure is formed with nickel or a nickel alloy.

Next, as shown in block 702, the strain sensitive structure is operably connected to sense circuitry (e.g., sense and processing circuitry 426 in FIG. 4). For example, the sense circuitry can be operably connected each strain sensing element (e.g., two vertically aligned strain sensors) in the strain sensitive structure. In one embodiment, the sense circuity can be configured as multiple channels with each channel receiving force signals from two or more strain sensing elements (e.g., 434 in FIG. 4). Each channel can include a multiplexer operably connected between the strain sensing elements and an amplifier, such as, for example, a differential programmable gain amplifier. The output of the amplifier may be operably connected to an analog-to-digital converter (ADC).

The number of channels may be determined, at least in part, by the number of multiplexers and the number of ADCs that will be included in the system. For example, in one embodiment a system can include eight channels with the sense circuitry including four M:1 multiplexers and eight ADCs. Alternatively, in another embodiment a system may include four channels with the sense circuitry including eight M:1 multiplexers and four ADCs.

Next, as shown in block 704, the sense circuitry may be operably connected to a processing device. For example, the output of the ADC in each channel in the sense circuitry can be operably connected to a processing device. The processing device is configured to receive the digital force signals from the sense circuity and to correlate the digital force signals (representing a change in an electrical property) to an amount of force.

Next, as shown in block 706, the strain sensitive structure, the sense circuitry, and the processing device can be included in an electronic device. The strain sensitive structure can be positioned below an input surface and the sense circuitry and processing device may be positioned at the same location or a different location as the strain sensitive structure. In some embodiments, the strain sensitive structure may be part of an input device configured to receive user inputs, such as a button or display. In other embodiments the strain sensitive structure can itself be an input device. As one example, a strain sensitive structure may be positioned below a portion of the enclosure of an electronic device (e.g., below a side surface of an enclosure).

Figure 8:
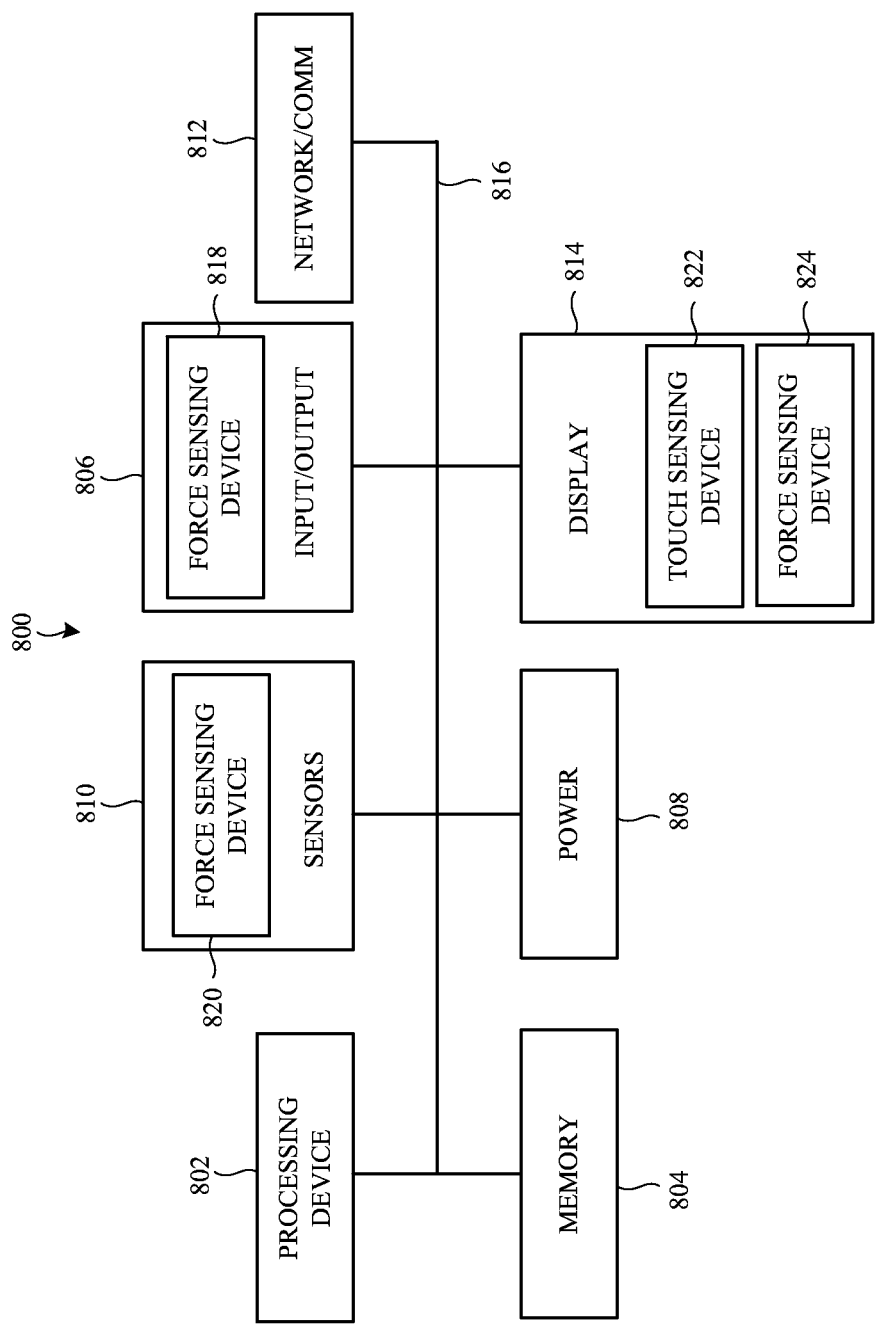
FIG. 8 shows a simplified block diagram of an electronic device that can utilize one or more strain sensors for force sensing.

FIG. 8 shows a simplified block diagram of an electronic device that can utilize one or more strain sensors for force sensing. The illustrated electronic device 800 can include one or more processing devices 802, memory 804, one or more input/output (I/O) devices 806, a power source 808, one or more sensors 810, a network communication interface 812, and a display 814, each of which will be discussed in more detail.

The one or more processing devices 802 can control some or all of the operations of the electronic device 800. The processing device(s) 802 can communicate, either directly or indirectly, with substantially all of the components of the device. For example, one or more system buses 816 or other communication mechanisms can provide communication between the processing device(s) 802, the memory 804, the I/O device(s) 806, the power source 808, the one or more sensors 810, the network communication interface 812, and/or the display 814. At least one processing device can be configured to determine an amount of force and/or a change in force applied to an I/O device 806, the display, and/or the electronic device 800 based on a signal received from one or more strain sensors.

The processing device(s) 802 can be implemented as any electronic device capable of processing, receiving, or transmitting data or instructions. For example, the one or more processing devices 802 can be a microprocessor, a central processing unit (CPU), an application-specific integrated circuit (ASIC), a digital signal processor (DSP), or combinations of multiple such devices. As described herein, the term "processing device" is meant to encompass a single processor or processing unit, multiple processors, multiple processing units, or other suitably configured computing element or elements.

The memory 804 can store electronic data that can be used by the electronic device 800. For example, the memory 804 can store electrical data or content such as audio files, document files, timing and control signals, operational settings and data, and image data. The memory 804 can be configured as any type of memory. By way of example only, memory 804 can be implemented as random access memory, read-only memory, Flash memory, removable memory, or other types of storage elements, in any combination.

The one or more I/O devices 806 can transmit and/or receive data to a user and from a user. Example I/O device(s) 806 include, but are not limited to, a touch sensing device such as a touchscreen or track pad, one or more buttons, a microphone, a haptic device, a speaker, and/or a force sensing device 818. The force sensing device 818 can include one or more strain sensors. The strain sensor(s) can be configured as one of the strain sensors discussed earlier in conjunction with FIGS. 2-4.

As one example, the I/O device 106 shown in FIG. 1 may include a force sensing device 818. As described earlier, the force sensing device 818 can include one or more strain sensors that are configured according to one of the embodiments shown in FIGS. 2-4. An amount of force that is applied to the I/O device 106, and/or a change in an amount of applied force can be determined based on the signal(s) received from the strain sensor(s).

The power source 808 can be implemented with any device capable of providing energy to the electronic device 800. For example, the power source 808 can be one or more batteries or rechargeable batteries, or a connection cable that connects the electronic device to another power source such as a wall outlet.

The electronic device 800 may also include one or more sensors 810 positioned substantially anywhere on or in the electronic device 800. The sensor or sensors 810 may be configured to sense substantially any type of characteristic, such as but not limited to, images, pressure, light, heat, touch, force, temperature, humidity, movement, relative motion, biometric data, and so on. For example, the sensor(s) 810 may be an image sensor, a temperature sensor, a light or optical sensor, an accelerometer, an environmental sensor, a gyroscope, a health monitoring sensor, and so on. In some embodiments, the one or more sensors 810 can include a force sensing device that includes one or more strain sensors. The strain sensor(s) can be configured as one of the strain sensors discussed earlier in conjunction with FIGS. 2-4.

As one example, the electronic device shown in FIG. 1 may include a force sensing device 820 in or under at least a portion of the enclosure 102. The force sensing device 820 can include one or more strain sensors that may be configured as one of the strain sensors discussed earlier in conjunction with FIGS. 2-4. An amount of force that is applied to the enclosure 102, and/or a change in an amount of applied force can be determined based on the signal(s) received from the strain sensor(s).

The network communication interface 812 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, infrared, RFID, Ethernet, and NFC.

The display 814 can provide a visual output to the user. The display 814 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. In some embodiments, the display 814 can function as an input device that allows the user to interact with the electronic device 800. For example, the display can include a touch sensing device 822. The touch sensing device 822 can allow the display to function as a touch or multi-touch display.

Additionally or alternatively, the display 814 may include a force sensing device 824. In some embodiments, the force sensing device 824 is included in a display stack of the display 814. The force sensing device 824 can include one or more strain sensors. An amount of force that is applied to the display 814, or to a cover glass disposed over the display, and/or a change in an amount of applied force can be determined based on the signal(s) received from the strain sensor(s). The strain sensor(s) can be configured as one of the strain sensors discussed earlier in conjunction with FIGS. 2-4.

It should be noted that FIG. 8 is exemplary only. In other examples, the electronic device may include fewer or more components than those shown in FIG. 8. Additionally or alternatively, the electronic device can be included in a system and one or more components shown in FIG. 8 is separate from the electronic device but in communication with the electronic device. For example, an electronic device may be operatively connected to, or in communication with a separate display. As another example, one or more applications or data can be stored in a memory separate from the electronic device. In some embodiments, the separate memory can be in a cloud-based system or in an associated electronic device.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
   an input surface configured to receive touch inputs;
   a strain sensitive structure positioned below the input surface, the strain sensitive structure comprising:
      an insulating substrate, parallel to the input surface;
      a first strain sensor formed with a metal nanostructure and positioned on a first surface of the insulating substrate; and
      a second strain sensor formed with a metal nanostructure and positioned on a second surface of the insulating substrate; and
   a processing device operably connected to the first strain sensor and the second strain sensor and configured to determine an amount of force applied to the input surface based on signals received from the first strain sensor and the second strain sensor.

2. The electronic device of claim 1, wherein the first and second strain sensors are aligned perpendicular to the input surface to produce a strain sensing element.

3. The electronic device of claim 2, wherein the processing device is configured to determine an amount of force applied to the input surface based on signals received from the strain sensing element.

4. The electronic device of claim 3, further comprising sense circuitry operably connected between the strain sensing element and the processing device.

5. The electronic device of claim 1, wherein the first strain sensor is included in a first film layer comprising a first set of strain sensors.

6. The electronic device of claim 1, wherein the metal nanostructure is formed with nickel.

7. The electronic device of claim 6, wherein the metal nanostructure comprises a nanomesh.

8. The electronic device of claim 6, wherein the metal nanostructure comprises a nanowire.

9. The electronic device of claim 1, wherein the input surface comprises a touch sensitive display.

10. An electronic device, comprising:
    a display stack for a display, comprising:
       a cover glass; and
       a strain sensitive structure positioned below the cover glass, the strain sensitive structure comprising:
          a first strain sensor positioned on a first surface of a substrate, the substrate parallel to the cover glass; and
          a second strain sensor positioned on a second surface of the substrate, the first and second strain sensors positioned in an area that is visible when viewing the display and the first strain sensor and second strain sensor aligned perpendicular to the display stack to produce a strain sensing element,
    wherein each of the first and second strain sensors is formed with a metal nanostructure.

11. The electronic device of claim 10, wherein the metal nanostructure comprises a nickel nanostructure.

12. The electronic device of claim 11, wherein the metal nanostructure comprises a nanomesh.

13. The electronic device of claim 11, wherein the metal nanostructure comprises a nanowire.

14. The electronic device of claim 10, further comprising sense circuitry operably connected to the strain sensing element.

15. The electronic device of claim 14, further comprising a processing device operably connected to the sense circuitry and configured to determine an amount of force applied to the cover glass based on signals received from the strain sensing element.

16. The electronic device of claim 10, further comprising a display layer positioned between the cover glass and the strain sensitive structure.

17. The electronic device of claim 16, further comprising a back light unit positioned below the strain sensitive structure.

18. A method of producing a strain sensitive structure in an electronic device, the method comprising:
    providing a set of strain gauges on first and second opposing surfaces of a substrate, wherein each strain gauge in the set is formed with a metal nanostructure, and a first strain gauge on the first surface is aligned with a second strain gauge on the second surface; and
    positioning the strain sensitive structure below an input surface of the electronic device, with the substrate parallel to the input surface.

19. The method of claim 18, wherein the metal nanostructure comprises a nickel nanostructure.

20. The method of claim 18, wherein the input surface comprises a cover glass disposed over a display layer, wherein the strain sensitive structure is positioned below the display layer.

* * * * *